United States Patent
Carter, Jr.

(10) Patent No.: US 7,490,792 B1
(45) Date of Patent: Feb. 17, 2009

(54) AIRCRAFT WITH ROTOR VIBRATION ISOLATION

(75) Inventor: Jay W. Carter, Jr., Burkburnett, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 290 days.

(21) Appl. No.: 11/280,127

(22) Filed: Nov. 16, 2005

Related U.S. Application Data (60) Provisional application No. 60/628,371, filed on Nov. 16, 2004.

(51) Int. Cl.
*B64C 27/00* (2006.01)
(52) U.S. Cl. .................................. 244/17.27
(58) Field of Classification Search .............. 244/17.27, 244/17.11, 54; 188/378–380; 248/561, 562, 248/554, 564, 567, 556, 557; 74/574, 586
See application file for complete search history.

(56) References Cited

U.S. PATENT DOCUMENTS

| | | | | |
|---|---|---|---|---|
| 3,118,504 A | * | 1/1964 | Cresap | 416/1 |
| 3,428,271 A | * | 2/1969 | Barzda et al. | 244/17.13 |
| 3,477,665 A | * | 11/1969 | Legrand | 244/17.25 |
| 3,698,663 A | * | 10/1972 | Balke et al. | 244/17.27 |
| 4,362,281 A | * | 12/1982 | Cresap et al. | 244/17.27 |
| 4,365,771 A | * | 12/1982 | Halwes | 244/17.27 |
| 4,720,060 A | * | 1/1988 | Yana | 244/17.27 |
| 5,301,900 A | | 4/1994 | Groen et al. | |
| 5,316,240 A | * | 5/1994 | Girard et al. | 244/17.27 |
| 5,392,885 A | * | 2/1995 | Patzenhauer et al. | 188/282.1 |
| 5,853,145 A | | 12/1998 | Carter, Jr. | |
| 6,024,325 A | | 2/2000 | Carter, Jr. | |
| 6,435,453 B1 | | 8/2002 | Carter, Jr. | |
| 6,527,515 B2 | | 3/2003 | Carter, Jr. | |
| 7,137,591 B2 | * | 11/2006 | Carter et al. | 244/17.27 |

OTHER PUBLICATIONS

U.S. Appl. No. 10/782,353, filed Feb. 19, 2004, Carter, Jr.

* cited by examiner

*Primary Examiner*—Tien Dinh
(74) *Attorney, Agent, or Firm*—Bracewell & Giuliani LLP (57) ABSTRACT

A rotor aircraft has a fuselage with a rotor mounted above by a rotor shaft. An arm is pivotally engaged with a lower portion of the rotor shaft and pivotally engaged with the fuselage, enabling the rotor to move with little restriction vertically and horizontal in all directions relative to the fuselage as the rotor rotates in order to isolate rotor oscillations. An infinitely variable air spring is used to counter vertical and fore and aft loads. Damping in the form of elastomeric materials, piston seal friction, and fluid flow through an orifice may be added as required.

21 Claims, 6 Drawing Sheets

AIRCRAFT WITH ROTOR VIBRATION ISOLATION

CROSS REFERENCE TO RELATED APPLICATION

This application claims the benefit of provisional application Ser. No. 60/628,371 filed Nov. 16, 2004.

FIELD OF THE INVENTION

This invention relates in general to rotor aircraft, and in particular to an assembly for isolating the rotor vertical, horizontal and side-to-side oscillations from the airframe.

BACKGROUND OF THE INVENTION

One type of rotor aircraft, referred to as a gyroplane, has a fuselage, wings, rotor and a propeller. For a jump takeoff, the rotor is pre-rotated to an overspeed while the aircraft is still on the ground. The propeller also is rotating. The pilot releases the brakes and increases the collective pitch on the propeller and rotor to cause the aircraft to lift from the ground. As the aircraft picks up forward speed, the wings assume more of the load and the rotor is tilted forward, decreasing the rotor speed and decreasing the load assumed by the rotor. At cruise speed, the rotor turns slowly while the wings supply most of the lift.

Changing the responsibilities of the rotor from primary lift source to passive lift source has great application and speed because the wings have much less drag than a fast turning rotor at high speeds. This transfer, however, can be responsible for significant ride vibrations or disturbances felt by the passengers. The oscillations, which occur twice per revolution for a two blade rotor, are due to the fact the rotor produces more lift and drag when the rotor is perpendicular to the airflow than when it is parallel to the airflow. Even when the rotor is substantially unloaded, these oscillations will be observable and made even more noticeable due to the reduced rotor RPM at the higher airspeeds. For large transport aircraft the rotor may be slowed down to 25 RPM during high speed cruise One way of reducing the disturbances felt by the passengers is by increasing the oscillation frequency by increasing the number of blades, because higher frequencies are not as disruptive to passengers. Typical rotor aircrafts such as helicopters do not slow down the rotor during cruise conditions, rather the blades remain rotating at a high speed. The gyroplane described above, however, is able to obtain high cruising speeds only by slowing down the rotor speed.

Rotor aircraft can increase oscillation frequency and reduce the amplitude by increasing the number of rotor blades. However, in addition to the increased complexity and weight from using more than two blades, there is another significant drawback to using more than two blades on the rotor, which is the inability to have compact storage. When using a three or four bladed rotor, it becomes necessary to fold the blades to store the aircraft compactly. This increases weight and complexity. A two bladed rotor has the ability to store compactly by arranging a rotor blade fore and aft over the aircraft. This eliminates the weight and complexity associated with folding, and allows for a more compact rotor hub housing. This advantage is particularly significant aboard an aircraft carrier where space is limited.

SUMMARY OF THE INVENTION

The rotor aircraft of this invention has a fuselage with a rotor shaft extending upward from the fuselage. A rotor is mounted to the rotor shaft. A drive mechanism in the fuselage rotates the rotor shaft. The drive mechanism is configured to isolate rotor horizontal and vertical oscillations/vibrations from the airframe by allowing the rotor to move in all directions with little restriction. Damping in the form of elastomeric materials, piston seal friction, fluid flow through an orifice, etc may be added as required.

Preferably, the rotor shaft extends upward from a gear box, which is operatively coupled to a shaft of the engine. A support arm is pivotally connected to the fuselage and to the gear box. The support arm allows vertical movement of the gear box and the rotor shaft about a pivot member. In addition the rotor shaft may pivot near the gearbox in the fore and aft direction and, to a lesser extent, from side to side.

One method of accomplishing this movement is to use elastomeric bearings with good dampening characteristics located on either side of the gearbox on the crossover shaft connecting a propeller on each side of the fuselage. The elastomeric bearings mount to the support arms described above and allow the rotor shaft to pivot fore and aft and tilt side to side due to the softness of the elastomeric bearings, allowing the rotor to move horizontally and vertically as required to isolate rotor oscillations/vibrations.

Preferably the vertical damper assembly comprises a piston and cylinder coupled between the support arm and the fuselage. The cylinder preferably contains air to support, isolate and dampen as required the oscillations of the gear box and arm. The fore and aft support, isolation and damper assembly could use a similar arrangement.

DETAILED DESCRIPTION OF THE INVENTION

Figure 1:
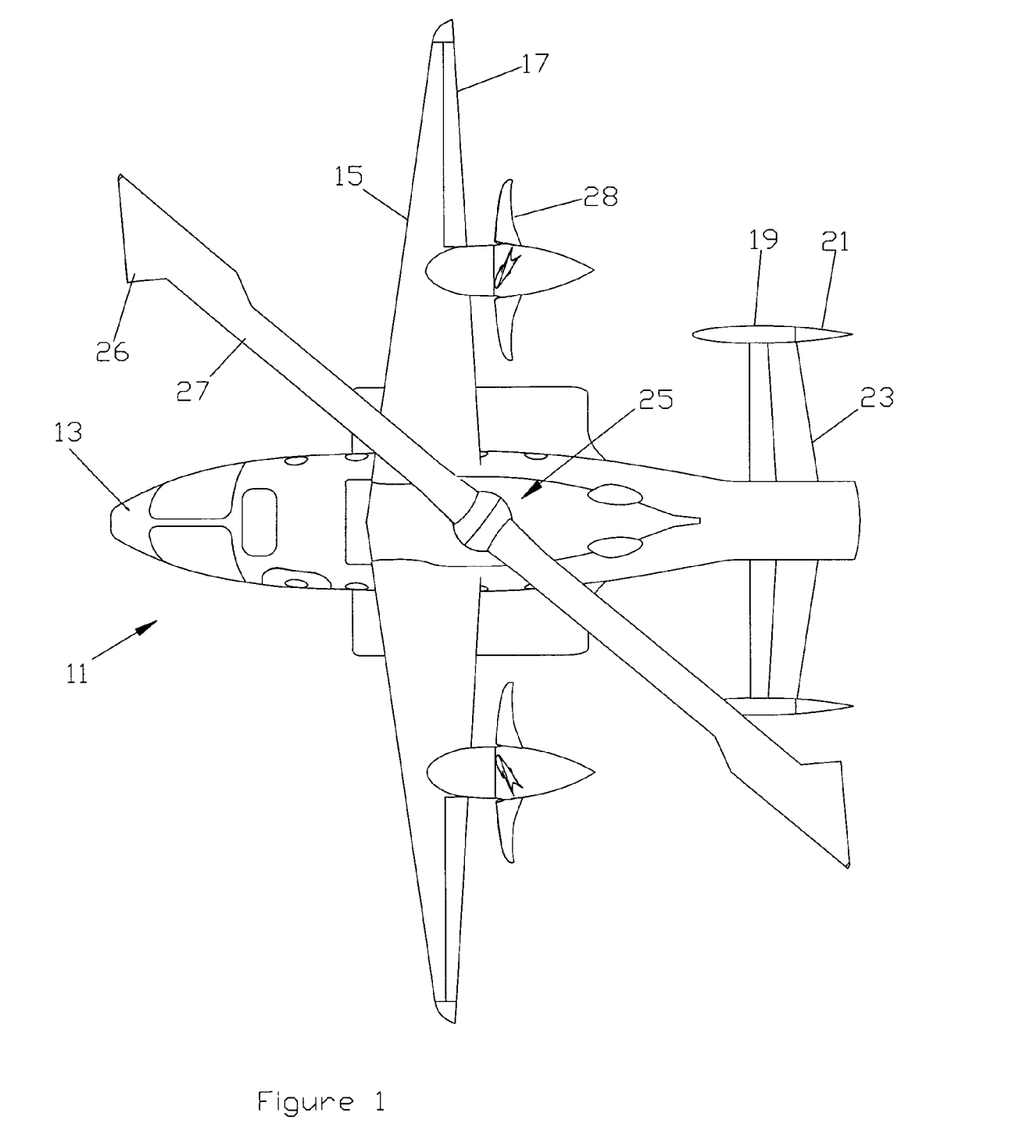
FIG. 1 is a top view illustrating a rotor aircraft constructed in accordance with this invention.

Referring to FIG. 1, an example of a rotor aircraft 11 is shown. Aircraft 11 has a fuselage 13 and two fixed wings 15. Each wing 15 has an aileron 17 in this embodiment. Aircraft 11 also has two vertical stabilizers 19, each located immediately forward of a movable rudder 21. A movable horizontal stabilizer, referred to as a stabilator 23, is located between vertical stabilizers 19.

A rotor 25 is mounted to the upper side of fuselage 13. Rotor 25 has two blades 27 in this embodiment, but it could have more than two. Each blade 27 has tip weights 26 for providing inertia for jump takeoff and stabilization at slow rotor speeds. Aircraft 11 has two propellers 28 in this embodiment, each mounted to one of the wings 15. Preferably propellers 28 provide differential thrust to counter the torque created by rotor 25 when driven during flight, particularly when hovering. Aircraft 11, alternately, could have a single propeller mounted along the longitudinal axis of fuselage 13. In that instance, rotor 25 would not be driven during flight, rather it is only driven prior to leaving the ground for jump takeoffs.

Figure 2:
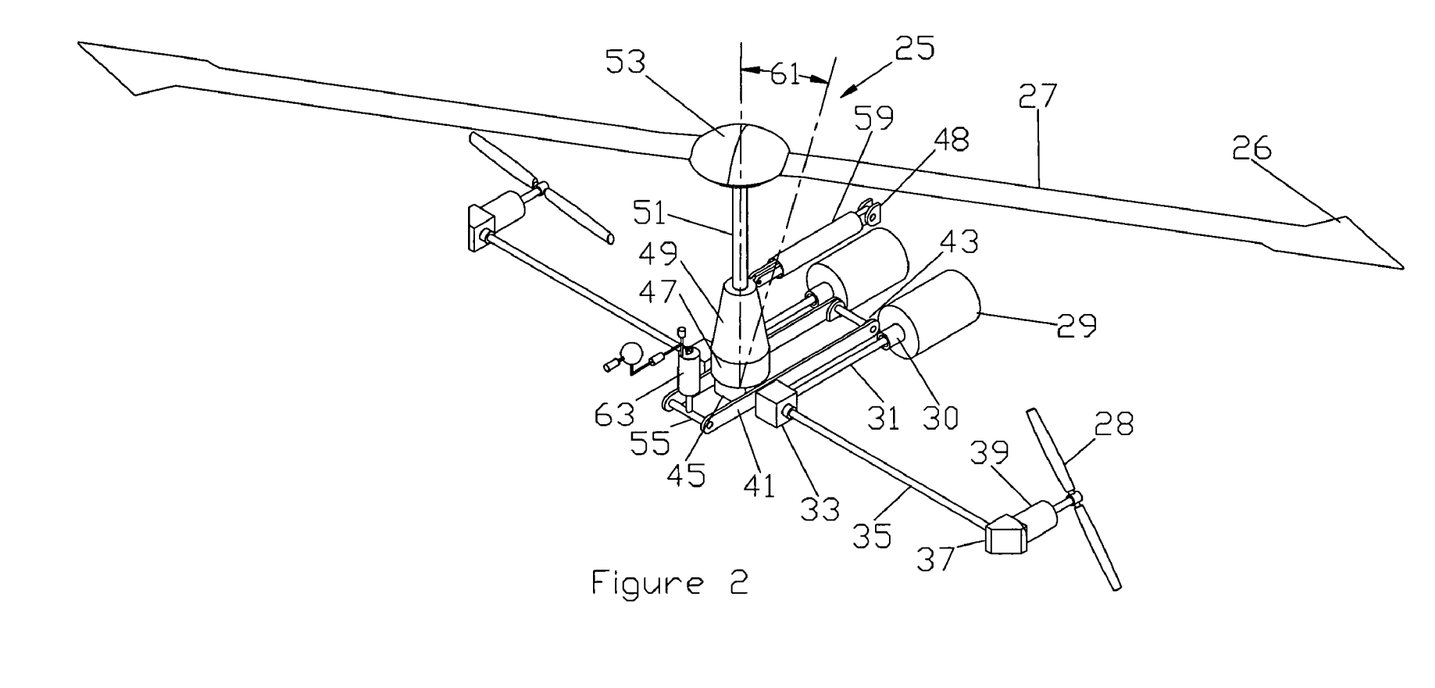
FIG. 2 is an exploded isometric and schematic view of the propulsion source, rotor and propeller drive assemblies of the rotor aircraft of FIG. 1.

Referring to FIG. 2, the drive assembly for aircraft 11 includes in this embodiment two engines 29, which could either be internal combustion or jet engines. Engines 29 are stationarily mounted in fuselage 13. Each engine 29 is connected by splined coupling and constant velocity joint 30 to a drive shaft 31, which in turn is connected to a gear box 33. Each gear box 33 is capable of limited vertical movement relative to fuselage 13. Each gear box 33 has a right angle output that couples to a propeller shaft 35 extending lengthwise along one of the wings 15. The outer ends of propeller drive shafts 35 connect to 90 degree gear boxes 37 that are stationarily fixed to wings 15 (FIG. 1). Gear boxes 37 connect to planetary gear boxes 39, which in turn drive propellers 28. The lengths of propeller drive shafts 35 and the type of coupling between drive shafts 35 and gear boxes 33 enable some flexing of drive shafts 35 to occur as gear boxes 33 oscillate vertically. The connections between constant velocity joints 30 and drive shafts 31 enable the forward ends of driven shafts 31 to pivot upward and downward with gear boxes 33 relative to the aft ends of drive shafts 31.

A pair of support arms 41 is mounted between and generally parallel to drive shaft 31. Support arms 41 extend in this embodiment farther forward than drive shafts 31. Support arms 41 are connected to a pivot support 43 at their aft ends. Pivot support 43 is pivotally mounted to fuselage 13 (FIG. 1). Pivot support 43 can pivot relative to fuselage 13 but cannot move in translational movement, such as vertical or horizontal.

Figure 3:
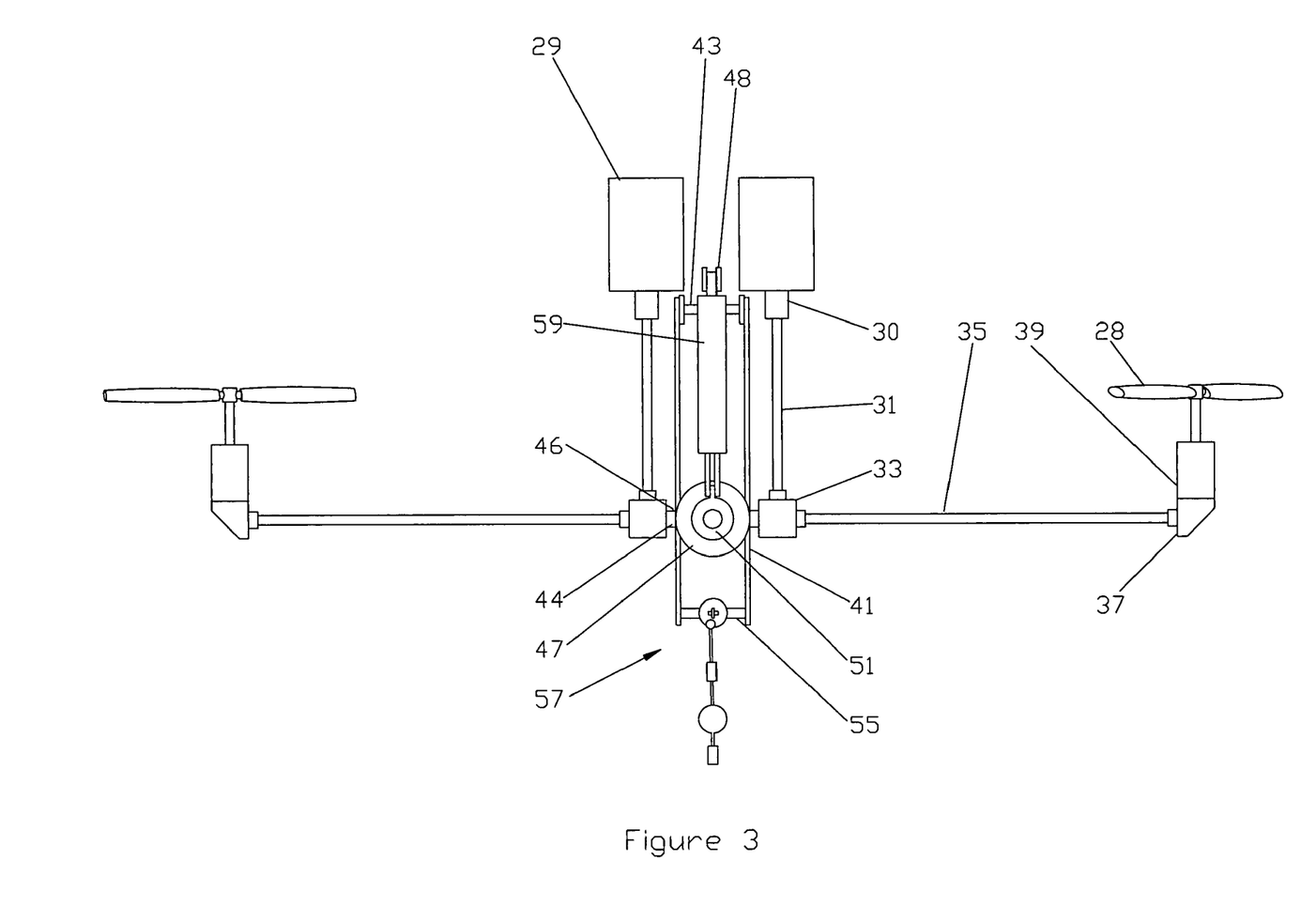
FIG. 3 is a top view of the drive assembly shown in FIG. 2.

A rotor 90 degree gear box 45 is mounted to and between support arms 41 for movement therewith. Rotor 90 degree gear box 45 is mounted in alignment with propeller drive shafts 35. Each gear box 33 has an output coupling 44 (FIG. 3) that couples to rotor 90 degree gear box 45 for driving rotor gear box 47. Rotor 90 degree gear box 45 is able to oscillate vertically in unison with gear boxes 33. Output couplings 44 extend through elastomeric bearings 46 mounted to arms 41 so that the rotor 90 degree gear box 45, planetary gear box 47, and rotor shaft 51 can tilt fore and aft and to a lesser extent side to side to isolate horizontal movements, oscillations, or vibrations of rotor 25 as it rotates. Likewise arms 41 pivot about pivot support 43 to isolate vertical movements, oscillations, or vibrations of rotor 25.

In this embodiment, a planetary gear box 47 mounts to the upper end and output of rotor 90 degree gear box 45. A conical transmission housing 49 is shown extending upward from planetary gear box 47. A rotor shaft 51 extends through transmission housing 49 into engagement with planetary gear box 47. A hub 53 (FIG. 2) is located at the upper end of rotor shaft 51. Hub 53 connects blades 27 to rotor shaft 51 for rotation therewith. Preferably, hub 53 has two halves that are able to twist relative to each other. Each half is integrally joined with one of the blades 27 for collective pitch changes. Rotor 25 can also be tilted relative to rotor shaft 51 for cyclic pitch control.

A forward crossbar 55 extends between the forward ends of support arms 41. A vertical oscillation isolation assembly 57 is mounted to forward crossbar 55 for supporting the rotor lift and for isolating the vertical oscillations caused by the rotation of blades 25.

Figure 6:
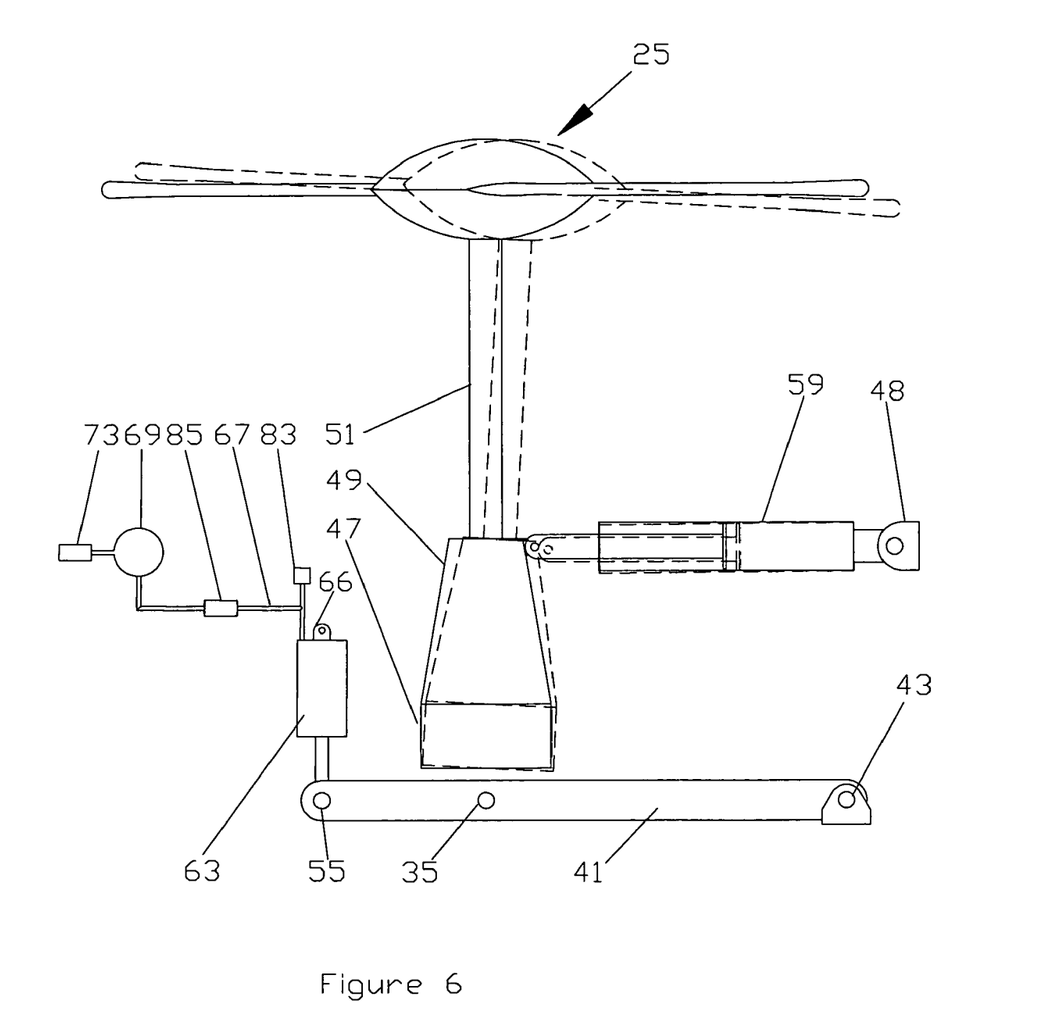
FIG. 6 is similar to FIG. 5 except it illustrates the fore and aft support, isolation and damper assembly.

In this embodiment, preferably the entire rotor shaft 51 can tilt fore and aft relative to fuselage 13 (FIG. 1) to selected positions for controlling the pitch of the aircraft. A tilt and damping cylinder 59 extends parallel to support arms 41 and from the rotor mast assembly to tilt cylinder 59 pivot support 48, which is attached to fuselage 13. The forward end of tilt and damping cylinder 59 is pivotally connected to part of the drive assembly, such as schematically shown in FIG. 2. Preferably, tilt and damping cylinder 59 is pneumatic, but it could be a combination pneumatic and hydraulic cylinder. As shown in FIG. 6, by increasing or decreasing the air pressure in tilt and damping cylinder 59, drive shaft 31 can be tilted a significant amount, such as up to 25 degrees.

By maintaining an average air pressure, tilt and damping cylinder 59 will hold the desired angular position, except for fore and aft oscillations occurring around that desired angular position due to rotation of rotor 25. The spring force due to the pneumatic pressure in tilt cylinder 59 is lighter when rotor shaft 51 is upright, thus providing less restriction to oscillating movement of the piston within tilt cylinder 59 and greater fore and aft movement of rotor shaft 51 during high speed cruise flight. The spring force in cylinder 59 due to the air pressure is light enough to allow fore and aft movements or vibrations of rotor 25 as it rotates regardless of the tilt position.

Figure 5:
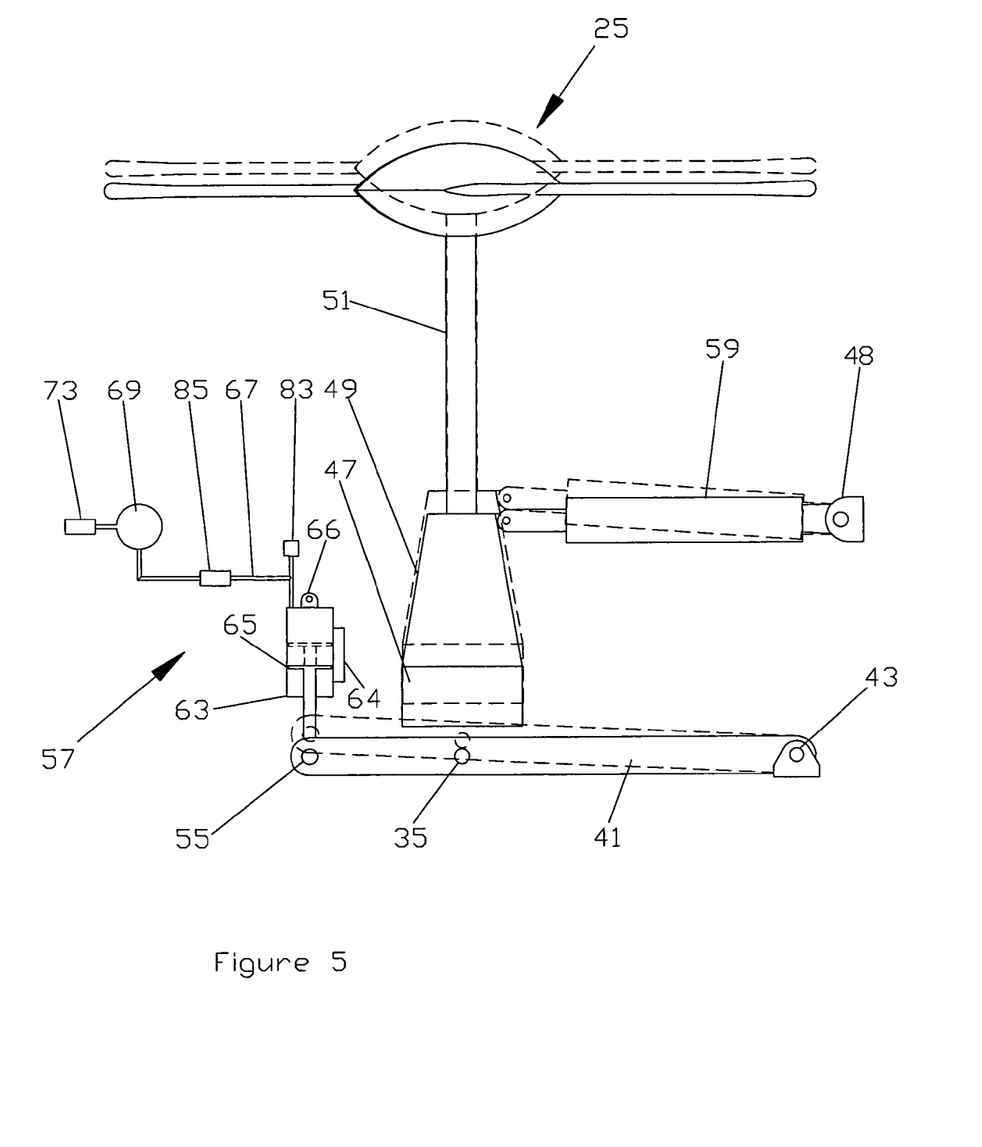
FIG. 5 is a side schematic view illustrating the vertical support, isolation and damper assembly of FIG. 4.

The dotted lines in FIG. 5 illustrate the oscillations or vibrations that occur due to the upward and downward movement of rotor 25, and FIG. 6 illustrates the oscillations or vibrations that occur due to the fore and aft movement of rotor 25. Note that fore and aft oscillations of rotor 25 do not cause arm 41 to pivot and do not affect damper assembly 57. Preferably as little damping as possible is used to dampen the fore and aft oscillations of rotor shaft 51 to avoid transferring forces absorbed by the damping into fuselage 13 (FIG. 1). If damping is required, it can be accommodated by the addition of hydraulic fluid to tilt cylinder 59, by increasing friction in tilt cylinder 59 or by other means. To make tilting rotor shaft 51 also function to isolate and dampen fore and aft movements or vibrations of rotor 25 as it rotates, a key element in this design is to also size the air volume on either side of the piston in cylinder 59 so that the natural frequency of this air spring/mass combination will always be less that the rotational speed of rotor 25. As in the vertical isolation system 57, the air pressure in tilt cylinder 59 will be the greatest when the rotor lift and RPM is the greatest, which makes it easier to keep the natural frequency of this system below the rotor RPM throughout the rotor operating range. The spring force due to the pneumatic pressure in tilt cylinder 59 is lighter when rotor shaft 51 is upright, thus allowing greater fore and aft movement of rotor shaft 51 during high speed cruise flight.

Figure 4:
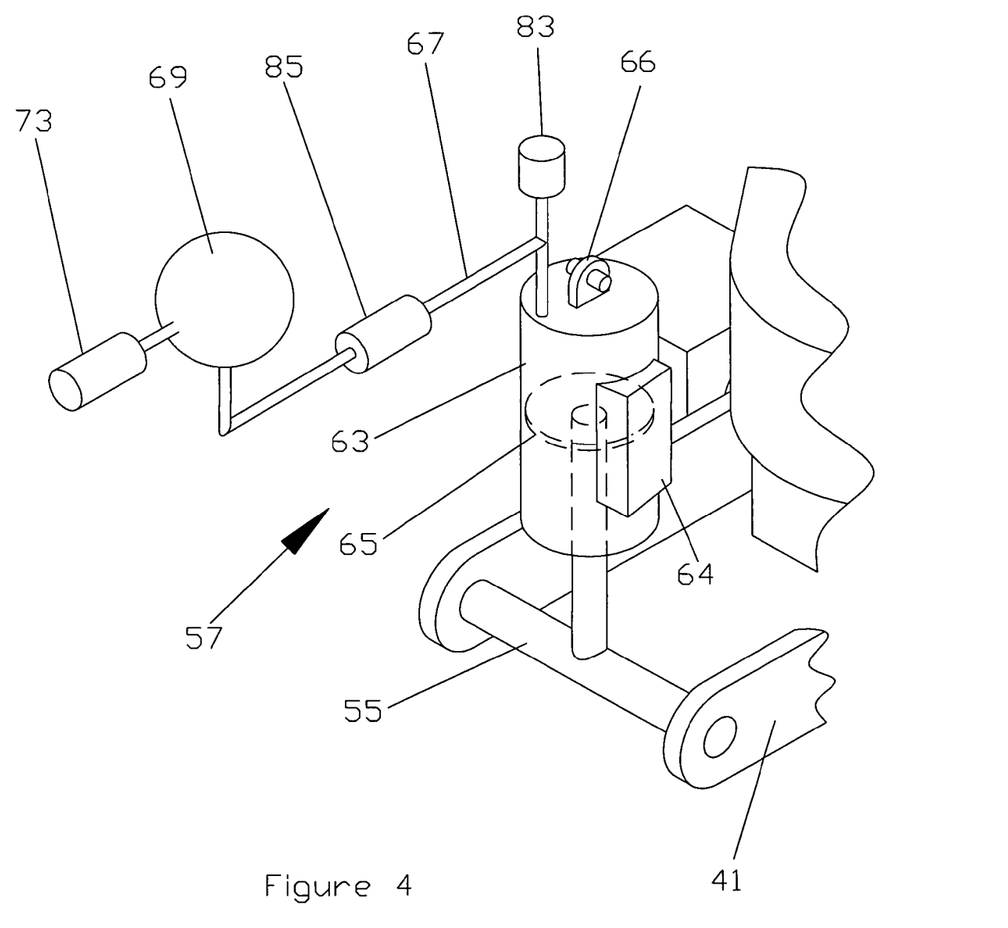
FIG. 4 is an enlarged isometric view of the vertical support, isolation and damper assembly for the rotor aircraft of FIG. 1.

FIGS. 4 and 5 illustrate one embodiment of vertical oscillation isolation assembly 57. A piston 65 has its lower end pivotally connected to forward crossbar 55. Piston 65 is part of air cylinder 63, which contains air pressure on the upper side of piston 65. In this embodiment, the lower side of cylinder 63 below piston 65 is open to the atmosphere. Air cylinder 63 is connected by a line 67 to an air accumulator 69. A connector 66 on the top of air cylinder 63 pivotally connects air cylinder 63 to fuselage 13 (FIG. 1). The air pressure is supplied by an air source 73, which typically is an air compressor. Sensor 64 senses the position of piston 65 and provides a signal through a controller (not shown) for operating valves 83 and 85 as required to keep piston 65 essentially centered in cylinder 63. Air pressure on top of piston 65 supports the lift of rotor 27. Opening valve 83 will reduce the air pressure by venting some of the air, while opening valve 85 will increase the air pressure. The pressure in accumulator 69 is charged by air source 73 to that required to support the maximum gross weight of the aircraft. The area of the piston and the pressure required is a basic design optimization.

A key element of this design is to size the air volume in the upper chamber of support cylinder 63 so that the natural frequency of this air spring/mass combination is always less than and never exceeds the rotational speed of rotor 25. This prevents a potential destructive resonate natural frequency from occurring. Note that when the rotor lift is the greatest, the rotational speed of rotor 25 must also be high to keep blades 27 from stalling. This means that the resulting higher vertical natural frequency of the system due to the higher air pressure has a tendency to track and always stay below the rotational speed of rotor 25.

In operation, aircraft 11 may take off conventionally on a runway, utilizing propellers 28 for thrust and wings 15 and rotor blades 27 for lift. Alternately, it may take off in a vertical or hover manner by driving rotor 25 and using propellers 28 to provide the differential thrust to counter the rotor torque. The pilot increases the collective pitch, which causes aircraft 11 to leave the ground. As aircraft 11 moves forward, air flows over wings 15, causing the wings to assume more of the lift. The pilot, or an automatic controller, reduces the collective pitch of rotor blades 27 and increases the pitch of propellers 28 as the aircraft accelerates.

At some speed the pilot or an automatic controller begins to tilt rotor 25 and rotor shaft 51 forward to reduce the rotor lift. If rotor 25 was powered for a hover type take-off, at some forward speed a clutch (not shown) disengages rotor shaft 51 from engines 29 during forward flight. As the forward speed and wing lift continues to increase, Rotor 25 can slow down and will continue to freewheel or auto-rotate. The lower the rotor RPM, the lower its drag, however at very low RPMs, the reduction in drag reaches a point of diminishing returns and further RPM reduction is not justified by a rapid reduction in rotor stability and control response.

As blades 27 rotate, either by freewheeling during forward flight or when driven, the difference in lift and drag between when rotor 25 is perpendicular to the air stream and parallel to the air stream causes oscillations of the rotor both vertically and horizontally. Rotor shaft 51 is free to move vertically a limited distance in unison with the oscillations. Gear boxes 33 and 45 move in response to the oscillations of rotor shaft 51 along an arcuate or curvilinear path which has a radius extending to pivot bar 43 and gear box couplings 44. Arms 41 pivot about pivot bar 43 as indicated by the dotted lines in FIG. 5. Damper and isolation assembly 57 smoothes and reduces the amplitudes of these oscillations. As arm crossbar 55 moves upward, piston 65 moves upward, but this upward movement is resisted by air pressure contained in cylinder 63.

While in flight, sensor 64 monitors the relative position of piston 65 to detect the average position of piston 65 within cylinder 63 and adjusts the air pressure as needed. If the average position is above the centerline of cylinder 63, air is added to the system through valve 85, which increases the pressure on top of piston 65. The opposite is true if the average position is lower than the centerline. In that case, valve 83 is opened and air is vented, which reduces the air pressure and force on top of piston 65 and allows it to move up.

At takeoff, the lift of rotor 25 increases, tending to pull rotor shaft 51 upward. The forward ends of arms 41 move upward to a maximum position stop. Position sensor 64 registers the average position of piston 65 as being too high in cylinder 63, and opens valve 85 to add air and increase the pressure. After landing and as the rotor lift decreases, the air pressure will be decreased to keep piston 65 centered, but at some point there will not be enough lift to keep the piston centered even with no air pressure and the piston will drop down to a low position stop.

During hover or initial lift, the pressure in accumulator 69 may rise up to five times the pressure that it will have at high speed cruise flight with rotor 25 unloaded. The spring rate of the system and its natural frequency will be higher during hover because of the higher pressure, yet if the volume of air on top of piston 65 is sized correctly, the higher natural frequency will still be less than the high rotor RPM required for hover.

High speed flight is the point at which the average rotor lift is the lowest and the dissimilar lift and drag by rotor 25 is the greatest. Less air pressure is needed to keep piston 65 centered, and as a result the lower air spring rate allows rotor 25 and transmission 45 to have more vertical travel relative to the aircraft. This helps isolate the dissimilar rotor forces from the airframe. The more rotor travel available both vertically and horizontally, the more these dissimilar rotor forces can be isolated from the airframe. Again proper sizing of the air volume above piston 65 will keep the system natural frequency less than the low rotor RPM associated with high speed cruise.

As illustrated in FIG. 6, tilting of rotor shaft 51 fore and aft with cylinder 59 does not affect damper assembly 57. Tilt cylinder 59 attaches to the fuselage at a point where cylinder 59 is parallel to arms 41 and the distance between attach points on cylinder 59 is the same as the distance between pivot points 43 and 44. This parallelogram arrangement keeps the rotor shaft 51 from tilting fore and aft as rotor shaft 51 moves vertically (FIG. 5). In addition to tilting rotor shaft 51 as required to control the aircraft pitch, tilt cylinder 59 also isolates the dissimilar fore and aft forces of rotor 25 at high cruise speeds and low rotor RPMs in the same manner as cylinder 63 and piston 65, The invention has significant advantages. The drive mechanism is configured to isolate rotor horizontal and vertical oscillations or vibrations from the airframe by allowing the rotor to move in all directions with little restriction. This arrangement allows a two bladed rotor to operate at a low RPM during high speed forward flight. The vertical and horizontal rotor isolation and damper mechanism does not interfere with tilting of the rotor. This rotor isolation and damper works when lift conditions are high on the rotor, such as at takeoff and landing, as well as when they are low on the rotor, at cruise conditions.

While the invention has been shown in only one of its forms, it should be apparent to those skilled in the art that it is not so limited but is susceptible to various changes without departing from the scope of the invention.

The invention claimed is:

1. A rotor aircraft, comprising:
   a fuselage;
   a rotor shaft extending upward from the fuselage;
   a rotor mounted to the rotor shaft;
   a drive mechanism in the fuselage for rotating the rotor shaft; and
   an isolation assembly mounted between the fuselage and the drive mechanism for allowing translational oscillations of the rotor shaft due to rotation of the rotor, and for isolating at least part of the translational movement of the rotor shaft from the fuselage, the isolation assembly comprising:
   a pneumatic piston and cylinder operatively coupled between the rotor shaft and the fuselage, the piston and cylinder having an air volume that provides a natural frequency less than the rotational speed of the rotor during flight;
   a detector for detecting a position of the piston within the cylinder; and
   an air pressure source for urging the piston to a central position between ends of a stroke of the piston.

2. The aircraft according to claim 1, wherein the isolation assembly restricts the translational oscillations to a curvilinear path.

3. The aircraft according to claim 1, further comprising:
a tilt assembly between the rotor shaft and the fuselage for selectively tilting the rotor shaft relative to the fuselage.

4. The aircraft according to claim 1, further comprising:
a pneumatic tilt cylinder between the rotor shaft and the fuselage for inclining the rotor shaft relative to the fuselage to a selected angle, the tilt cylinder having a volume sized for allowing fore and aft oscillations of the rotor shaft due to rotation of the rotor.

5. The aircraft according to claim 1, wherein the drive mechanism comprises:
a power source;
a driven shaft coupled to the power source; and
a gearbox having an input coupled to the driven shaft and an output to the rotor shaft; and
wherein the isolation assembly further comprises:
a support arm connected by a first pivot member to the fuselage and by a second pivot member to the gearbox, enabling arcuate movement of the gearbox about the first pivot member.

6. The aircraft according to claim 1, wherein the pneumatic cylinder is operatively coupled between the rotor shaft and the fuselage parallel to the rotor shaft, the pneumatic cylinder having a volume selected to keep its natural frequency below the rotational speed of the rotor.

7. The aircraft according to claim 1, wherein the drive mechanism comprises:
a power source;
a driven shaft coupled to the power source; and
a gearbox having an input coupled to the driven shaft and an output to the rotor shaft; and
wherein the isolation assembly further comprises:
a support arm connected by a first pivot member to the fuselage and by a second pivot member to the gearbox, enabling arcuate movement of the gearbox about the first pivot member; and
the pneumatic cylinder is coupled between the rotor shaft and the support arm.

8. The aircraft according to claim 1, further comprising:
a gearbox mounted to the lower portion of the rotor shaft for oscillations with the rotor shaft;
a pair of wings extending from the fuselage;
a pair of propellers, each mounted to one of the wings; and
a pair of propeller drive shafts, each extending from one of the propellers to the gearbox, the propeller drive shafts deflecting as the gearbox oscillates.

9. A rotor aircraft, comprising:
a fuselage;
a rotor shaft extending upward from the fuselage;
a rotor mounted to the rotor shaft;
a rotor assembly mounted to the lower portion of the rotor shaft;
an arm pivotally engaged with a lower portion of the rotor assembly and pivotally engaged with the fuselage, the arm being pivotal relative to the fuselage between upper and lower positions, enabling the shaft, the rotor assembly and the arm to oscillate relative to the fuselage as the rotor rotates; and
a bias member mounted between the arm and the fuselage for urging the arm to a central position between the upper and lower positions, the bias member comprising:
a pneumatic cylinder having a piston that strokes therein in response to the oscillations of the shaft and the arm;
a detector for detecting a position of the piston within the cylinder; and
an air pressure source that varies air pressure to the pneumatic cylinder to urge the piston toward a substantially central position in the cylinder.

10. The aircraft according to claim 9, wherein the point where the arm pivotally engages the fuselage is aft of the point where the arm pivotally engages the lower portion of the rotor assembly.

11. The aircraft according to claim 9, further comprising:
a pneumatic tilt cylinder having one end in cooperative engagement with the rotor shaft and another end pivotally carried by the fuselage for selectively tilting the rotor shaft about its lower portion relative to the fuselage, the tilt cylinder having a spring force allowing fore and aft oscillations of the rotor shaft relative to the fuselage regardless of the angle of tilt.

12. The aircraft according to claim 9, further comprising:
a gearbox mounted to the lower portion of the rotor shaft, the gearbox being pivotally connected to the arm for oscillations with the rotor shaft;
a pair of wings extending from the fuselage;
a pair of propellers, each mounted to one of the wings; and
a pair of propeller drive shafts, each extending from one of the propellers to the gearbox, the propeller drive shafts deflecting as the gearbox oscillates.

13. The aircraft according to claim 9, further comprising:
a power source;
a driven shaft coupled to the power source;
a gearbox having an input coupled to the driven shaft and an output to the rotor shaft; and wherein:
the arm is connected by a first pivot member to the fuselage and by a second pivot member to the gearbox, enabling arcuate movement of the gearbox about the first pivot member in unison with oscillations of the rotor shaft.

14. A gyroplane, comprising:
a fuselage;
a thrust means to propel the gyroplane forward;
a rotor shaft extending upward from the fuselage;
a rotor mounted to the rotor shaft, the rotor rotating at reduced speed during cruising conditions;
a drive mechanism in the fuselage for rotating the rotor shaft; and
an isolation assembly mounted between the fuselage and the drive mechanism for allowing translational oscillations of the rotor shaft due to rotation of the rotor, and for isolating at least part of the translational movement of the rotor shaft from the fuselage, the isolation assembly comprising:
a pneumatic piston and cylinder operatively coupled between the rotor shaft and the fuselage, the piston and cylinder having an air volume that provides a natural frequency less than the rotational speed of the rotor during flight;
a detector for detecting a position of the piston within the cylinder; and
an air pressure source for urging the piston to a central position between ends of a stroke of the piston.

15. The aircraft according to claim 14, wherein the isolation assembly restricts the translational oscillations to a curvilinear path.

16. The aircraft according to claim 14, further comprising:
a tilt assembly between the rotor shaft and the fuselage for selectively tilting the rotor shaft relative to the fuselage.

17. The aircraft according to claim 14, further comprising:
a pneumatic tilt cylinder between the rotor shaft and the fuselage for inclining the rotor shaft relative to the fuselage to a selected angle, the tilt cylinder having a volume sized for allowing fore and aft oscillations of the rotor shaft due to rotation of the rotor.

18. The aircraft according to claim 14, wherein the drive mechanism comprises:
   a power source;
   a driven shaft coupled to the power source; and
   a gearbox having an input coupled to the driven shaft and an output to the rotor shaft; and
   wherein the isolation assembly further comprises:
   a support arm connected by a first pivot member to the fuselage and by a second pivot member to the gearbox, enabling arcuate movement of the gearbox about the first pivot member.

19. The aircraft according to claim 14, wherein the pneumatic cylinder is operatively coupled between the rotor shaft and the fuselage parallel to the rotor shaft, the pneumatic cylinder having a volume selected to keep its natural frequency below the rotational speed of the rotor.

20. The aircraft according to claim 14, wherein the drive mechanism comprises:
   a power source;
   a driven shaft coupled to the power source; and
   a gearbox having an input coupled to the driven shaft and an output to the rotor shaft; and
   wherein the isolation assembly further comprises:
   a support arm connected by a first pivot member to the fuselage and by a second pivot member to the gearbox, enabling arcuate movement of the gearbox about the first pivot member; and
   the pneumatic cylinder is coupled between the rotor shaft and the support arm.

21. The aircraft according to claim 14, further comprising:
   a gearbox mounted to the lower portion of the rotor shaft for oscillations with the rotor shaft; and
   a pair of wings extending from the fuselage; and
   wherein the thrust means comprises:
   a pair of propellers, each mounted to one of the wings; and
   a pair of propeller drive shafts, each extending from one of the propellers to the gearbox, the propeller drive shafts deflecting as the gearbox oscillates.

* * * * *

UNITED STATES PATENT AND TRADEMARK OFFICE
CERTIFICATE OF CORRECTION

| | |
|---|---|
| PATENT NO. | : 7,490,792 B1 |
| APPLICATION NO. | : 11/280127 |
| DATED | : February 17, 2009 |
| INVENTOR(S) | : Jay W. Carter, Jr. |

It is certified that error appears in the above-identified patent and that said Letters Patent is hereby corrected as shown below:

Claim 14:

Column 8, line 34, delete "gyroplane" and insert --aircraft--

Signed and Sealed this
Eighth Day of November, 2011

David J. Kappos
*Director of the United States Patent and Trademark Office*